(12) United States Patent
Schoen

(10) Patent No.: US 7,823,268 B2
(45) Date of Patent: Nov. 2, 2010

(54) ANGULAR TRANSDUCER UNIT AND METHOD FOR ITS MANUFACTURE, AS WELL AS ANGULAR SWITCHING DEVICE AND DEVICE FOR THE DETECTION OF OBJECTS

(75) Inventor: Dierk Schoen, Egelsbach (DE)

(73) Assignee: Pepperl + Fuchs GmbH, Mannheim (DE)

( * ) Notice: Subject to any disclaimer, the term of this patent is extended or adjusted under 35 U.S.C. 154(b) by 476 days.

(21) Appl. No.: 10/597,110

(22) PCT Filed: Jan. 12, 2005

(86) PCT No.: PCT/EP2005/000220

§ 371 (c)(1),
(2), (4) Date: May 10, 2007

(87) PCT Pub. No.: WO2005/068941

PCT Pub. Date: Jul. 28, 2005

(65) Prior Publication Data

US 2007/0289123 A1    Dec. 20, 2007

(30) Foreign Application Priority Data

Jan. 14, 2004 (DE) .................. 10 2004 002 014

(51) Int. Cl.
*H01S 4/00* (2006.01)
*G01R 3/00* (2006.01)
*H01H 11/00* (2006.01)
*H01H 65/00* (2006.01)
*H05K 3/30* (2006.01)

(52) U.S. Cl. .................. 29/592.1; 29/595; 29/622; 29/832

(58) Field of Classification Search ............... 29/592.1, 29/595, 622, 832–834; 250/221, 222.1
See application file for complete search history.

(56) References Cited

U.S. PATENT DOCUMENTS 4,270,153 A * 5/1981 Bejerano et al. ......... 360/78.02

(Continued)

FOREIGN PATENT DOCUMENTS

DE    3008309 C2    9/1981

(Continued)

OTHER PUBLICATIONS

PCT International Preliminary Report on Patentability, International Application No. PCT/EP2005/00020, International Filing Date Jan. 12, 2005.

*Primary Examiner*—A. Dexter Tugbang
*Assistant Examiner*—David P Angwin
(74) *Attorney, Agent, or Firm*—John A. Merecki; Hoffman Warnick LLC

(57) ABSTRACT

The present invention relates to a method for the manufacture of a transducer unit for an angular switching device, in which a transducer element is inserted and fixed in an angled bush. The inventive method is characterized in that the transducer element is brought into aligned engagement with a transducer receptacle formed in a tool, that subsequently for the precise positioning with respect to the transducer element the bush is brought into an aligned, at least partial positive engagement with a bush receptacle appropriately constructed in the tool and that for completing the transducer unit the transducer element is fixed in the bush. In further aspects the invention relates to an angular transducer unit, an angular switching device and an object detection device.

23 Claims, 5 Drawing Sheets

U.S. PATENT DOCUMENTS

Figure 1:
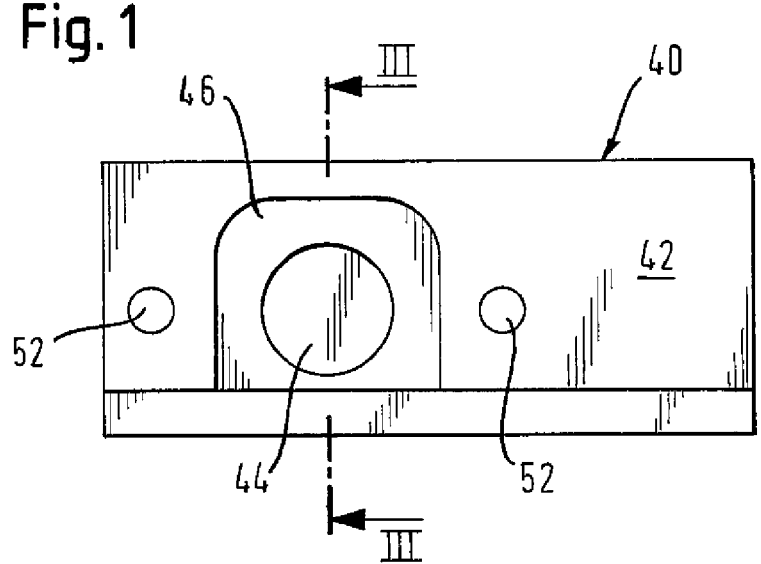

| | | | | | |
|---|---|---|---|---|---|
| 4,270,155 | A | * | 5/1981 | Bejerano | 360/291.2 |
| 4,966,969 | A | * | 10/1990 | Sato et al. | 544/352 |
| 6,073,525 | A | * | 6/2000 | Edwards | 83/34 |
| 6,121,862 | A | * | 9/2000 | von Eckroth et al. | 335/6 |
| 6,699,425 | B1 | * | 3/2004 | Reuther et al. | 264/408 |
| 7,275,298 | B2 | * | 10/2007 | Schindel | 29/594 |
| 2002/0172000 | A1 | * | 11/2002 | Walter et al. | 361/600 |

FOREIGN PATENT DOCUMENTS

| | | | |
|---|---|---|---|
| DE | 4328366 | C3 | 3/1995 |
| DE | 4442478 | A1 | 6/1995 |
| DE | 19504608 | A1 | 8/1996 |
| DE | 19521361 | A1 | 12/1996 |
| DE | 20106871 | U1 | 8/2001 |
| DE | 10058480 | A1 | 6/2002 |
| DE | 50000283 | U1 | 8/2002 |
| DE | 10116019 | | 10/2002 |
| DE | 10116019 | A1 | 10/2002 |
| EP | 1067053 | A1 | 1/2001 |

* cited by examiner

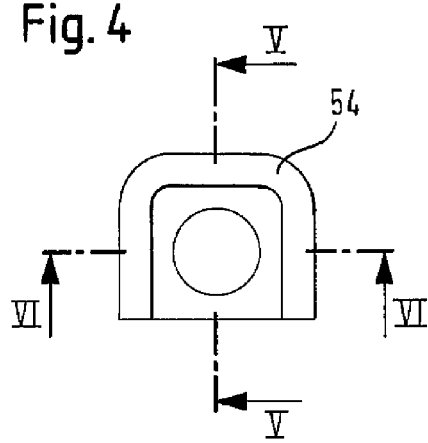
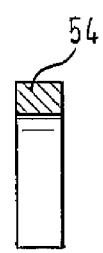
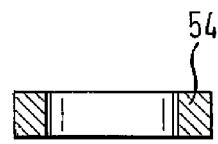
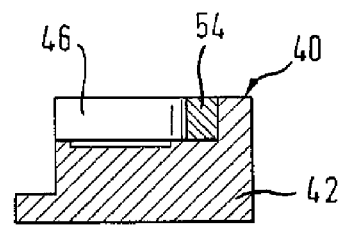
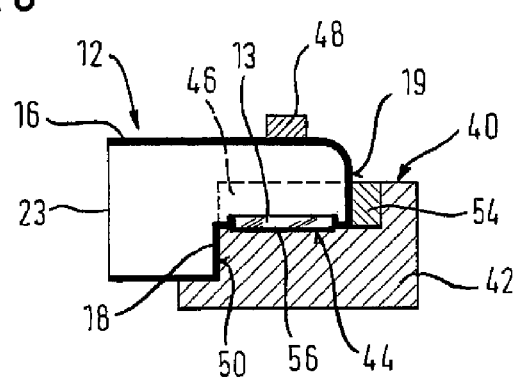

ANGULAR TRANSDUCER UNIT AND METHOD FOR ITS MANUFACTURE, AS WELL AS ANGULAR SWITCHING DEVICE AND DEVICE FOR THE DETECTION OF OBJECTS

In a first aspect the present invention relates to a method for the manufacture of a transducer unit for an angular switching device. In further aspects the invention relates to a transducer unit manufactured through the method, to an angular switching device and to a device for the detection of objects.

Angular switching devices, i.e. switching devices in which a detection or radiation area of a transducer assumes an angle of e.g. 90° relative to the casing axis of the switching device are e.g. known from DE 201 06 871 U1. Such an angular switching device has the following components: an angular transducer unit with a transducer element, a casing sleeve for receiving electronics, in which the transducer unit is positioned at one end of the casing sleeve, and a connection part positioned at a second end of the casing sleeve for connection to external equipment.

Such angular switching devices are appropriately then used where conventional switching devices with a substantially axially extending detection or radiation area are unusable for space reasons, i.e. where a very compact layout of the switching devices is necessary or desired.

A device according to the preamble for the detection of objects, particularly for the detection of labels, is described in EP 1 067 053 A1. In that case transmitters and receivers are housed in a forked casing.

Angular switching devices are also described in EP 1 067 053 A1, DE 200 05 283 U1, DE 100 58 480 A1 and DE 30 08 309 C2.

DE 43 28 366 C3 and DE 195 21 361 A1 relate to axial switching devices.

A device for the detection of multiple sheets is disclosed in U.S. Pat. No. 4,066,969.

In the manufacture of an angular transducer unit a transducer element is inserted and fixed in an angled bush. The term angled bush is here understood to mean a tubular component with a first, axial opening for connection to a casing sleeve of a switching device and with a second opening transversely to the axial direction. The second opening is the entrance or exit opening for the transducer element.

Compared with axial switching devices the relative positioning of the transducer element relative to the bush is more difficult in the case of an angular transducer unit, because there the positioning cannot essentially be obtained by centring with respect to the casing axis.

The object of the present invention is to provide a method for the manufacture of an angular transducer unit for an angular switching device with which such transducer units can be very precisely manufactured, that can be easily and inexpensively performed and is also suitable for an industrial scale production. In addition, an angular transducer unit, an angular switching device and an object detection device are to be provided, which are also easy and precise to manufacture.

In a first aspect this object is achieved by the method having the features of claim 1.

Advantageous variants of the method and preferred embodiments of the inventive angular transducer unit, angular switching device and object detection device form the subject matter of the subclaims.

The method of the aforementioned type is inventively further developed in that the transducer element is brought into aligned engagement with a transducer receptacle formed in a tool, that subsequently the bush for precise positioning with respect to the transducer element is brought into an aligned and at least partly positive engagement with a bush receptacle suitably formed in the tool and that for the production of the transducer unit the transducer element is fixed in the bush.

In the case of the angular transducer unit according to the invention prior to the fixing of the transducer element it can be received with clearance in the bush and the transducer element is given a defined positioning with respect to the bush with the aid of a tool, particularly in accordance with the inventive method.

In the case of the angular switching device according to the invention the angular transducer unit is manufactured in accordance with the inventive method.

A first fundamental principle of the invention is that the assembly of the transducer element and bush requires the use of a suitably shaped tool, which can also be referred to as a stop fitting or form. In said tool is formed a transducer receptacle with which the transducer element is inventively brought in a first method step into aligned engagement.

A further fundamental principle of the invention is that for the precise positioning of the bush relative to the transducer element the bush is also brought into an aligned engagement with the tool. For this purpose the tool is also provided with a suitably shaped bush receptacle.

A first major advantage of the inventive method is that the precision and reproducibility of positioning can be significantly improved. Thus, the inventive method is particularly suitable for industrial scale production.

A second important advantage is that the method can be performed using simple means, i.e. inexpensively.

With the method according to the invention, if the transducer element has a clearance in the angled bush, i.e. is not positively received there, the relative position of bush and transducer element can be adjusted precisely and in a defined manner by a suitable choice of tool. Thus, there is a high manufacturing variability.

It is also advantageous that in the case of a possibly modified relative position between transducer element and bush, it is not necessary to replace the shaping tools for the transducer element and/or bush, but instead only the much less expensive positioning tool.

In a preferred variant of the inventive method the transducer element is fixed relative to the tool. This facilitates the relative positioning of the transducer element with respect to the bush and safety is increased.

The transducer element can e.g. be fixed by vacuum, adhesives, particularly an adhesive tape, and/or by magnets.

If e.g. using the same tool body it is wished to manufacture transducer units using transducer elements of different sizes, it can be appropriate for the transducer receptacle to at least partly be formed by a transducer centring device, which is inserted or engaged in a tool body of the tool.

In a particularly preferred variant of the method a transducer element is initially appropriately aligned relative to the tool body using a transducer centring device, and fixed e.g. by a vacuum. The transducer centring device is then removed again, so that after filling the gaps with foam or moulding material, by means of the hardened foam or hardened moulding material, the transducer surface and a bush boundary surface form a planar termination.

If transducer units with bushes of different size are to be manufactured with the same tool body, it can be appropriate for the bush receptacle to at least partly be formed by a bush centring device, which is inserted or engaged in the tool body.

Additional safety can be obtained through the transducer centring device and/or bush centring device being fixed with respect to the tool body.

In principle, any type of fixing can be used. For example, the transducer centring device and/or bush centring device can be fixed by adhesives, particularly an adhesive tape, and/or by vacuum. However, a variant of the method in which the transducer centring device and/or bush centring device is fixed by magnets is particularly easy to perform.

It can also be appropriate in this connection to fix the bush relative to the tool, particularly using a holder provided on the tool.

If the transducer element is to be fixed by vacuum with respect to the tool body, the transducer element can be sucked onto the tool by means of at least one vacuum duct in the tool body.

In a particularly simple manner the transducer element can be connected or fixed relative to the bush if gaps in the bush are at least partly filled with foam or moulding material. Known materials can be used for this purpose.

An outward passage of foam or moulding material as a result of a suction effect of the vacuum and resulting problems in the case of a relative alignment can be avoided if a pressure compensation takes place on radially outer areas of a sucked on transducer element using compensating ducts in the tool body.

In a particularly preferred variant of the method use is made of a tool with steps, which as a stop can engage with a front end and/or a setback shoulder of the bush. The steps make it possible in simple manner to bring about an at least partial positive engagement of the bush with the tool.

In connection with large scale production it is also advantageous to manufacture several transducer units in parallel using a single tool with a plurality of transducer receptacles and bush receptacles. The step-like tool body variant is e.g. particularly appropriate for construction using a plurality of transducer and bush receptacles.

To avoid the influence of interfering radiation on the transducer element in operation, the inside of the bush can be at least partly metallized or use can be made of a shielding can pressed into the bush by positive engagement.

A particularly stable structure and a clearly defined alignment of the components is brought about by fixing, particularly soldering the shielding can to a printed circuit board.

It is also appropriate in this connection to solder the transducer element to the shielding can, particularly by means of a clip provided thereon.

Additionally or alternatively the bush can be brought into a positive and/or non-positive engagement, particularly a locking engagement with a printed circuit board.

The functionality of the transducer units can be increased by inserting and fixing several transducer elements in an angled bush.

The transducer unit according to the invention can in principle be used both as a transmitter and a receiver. The transducer element can e.g. have a random sensor, particularly an inductive, optical, capacitive, temperature, pressure and/or ultra-sonic sensor.

It is particularly useful to use an inventive transducer unit in a switching device constructed as a proximity switch and which operates cyclically and/or in a barrier operation.

A cyclic switching device is here understood to mean a device in which a transducer emits a signal and simultaneously or optionally with a time lag the response from a possibly present object is detected. As opposed to this in the case of a barrier, e.g. a count barrier, a separate transmitter and separate receiver are provided.

Undesired irradiation of the inventive switching device can be reduced or avoided if a shielding sleeve is provided for shielding purposes in the casing sleeve of the switching device.

Such a switching device is preferably manufactured in a single-operation method, such as is e.g. described in German patent application 103 59 885.5.

Alignment of the switching device is made easier if the casing sleeve is angular and in particular square in profile. However, a cylindrical casing sleeve permits a variable or a standardized switching device positioning in proximity switch technology.

The inventive switching device permits a very high functionality. In particular, the switching device can be constructed as a transmitter and/or receiver. There can also be several transducer elements, optionally also in several bushes.

The advantages of the inventive switching device can be particularly appropriately used in a device for the detection of objects with at least one transmitter for emitting a measuring signal in a detection area and with at least one receiver for receiving an incoming signal from the detection area, the transmitter and/or receiver being constructed as an inventive, angular switching device. Both the transmitter and receiver can be in an angular, more particularly profile-square/cylindrical casing shape.

When a very compact installation is required, it is advantageous to provide an evaluating unit, where the transmitter, receiver and evaluating unit are in each case housed in separate casings. Thus, receiver and transmitter are offset from the evaluating unit.

In a further advantageous and particularly inexpensive solution of the inventive device the transducer elements are directly fitted in a separate, very short bush (approx. 8 to 12 mm), which can also be called a transducer receptacle, this taking place orthogonally to the circuit board plane. To cut down costs, the transducer unit is treated like an electromechanical component, which is solderable to the circuit board by means of at least one clip on the bush-like shielding can. A mechanical alignment, particularly with respect to the parallel positioning, takes place by means of the transducer receptacle resting flat on the circuit board. To avoid an inadmissible stressing of the soldered joints in special cases the transducer receptacle can have pins and/or detents, which engage in the circuit board, mechanically fix the same and at the same time form a stop with respect to said circuit board. Additional strength can be brought about by an adhesive fixing of the transducer receptacle and/or the bush-like shielding can. If a metallic shielding can is unnecessary or is unusable, alternatively use can be made of a bush-like can which has a locking engagement with the printed circuit board.

Such a device is particularly suitable for detecting or recognizing single, missing and/or multiple sheets, e.g. in printing presses. For this purpose the transmitter is appropriately an ultrasonic and/or optical transmitter and/or a capacitive sensor is provided, the receiver then being constructed with corresponding ultrasonic and/or optical sensors, or in the case of a capacitive sensor a precisely aligned capacitor element must be formed.

The supply of transmitter and receiver can also take place separately, so that there is no need for a connection between the transmitter unit and receiver unit. This can in particular be necessary if significant distances are to be bridged with angled barrier layouts or very wide objects are to be measured, particularly paper webs.

As a result of the angular design of the switching devices, the device can be constructed in a particularly compact manner opening up new areas of use.

A defined relative positioning can be achieved in a particularly simple manner if the transmitter and receiver are located in a joint holder.

As the electronics for the transmitter normally take up less space than the electronics for the receiver, in an inexpensive variant the transmitter can be constructed as an axial switching device.

Further advantages and features of the method according to the invention, the angular transducer unit, the angular switching device and the device for the detection of objects are described in greater detail hereinafter relative to the attached diagrammatic drawings, wherein show:

FIG. 1 A plan view of a tool for performing the inventive method.

Figure 2:
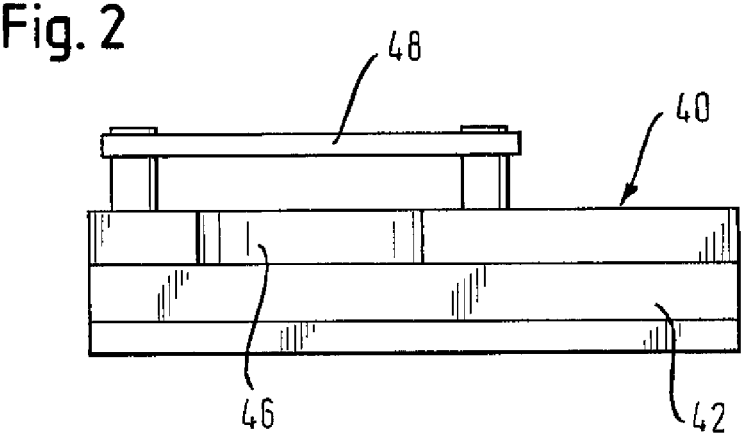

FIG. 2 The tool of FIG. 1 in a view from the front.

Figure 3:
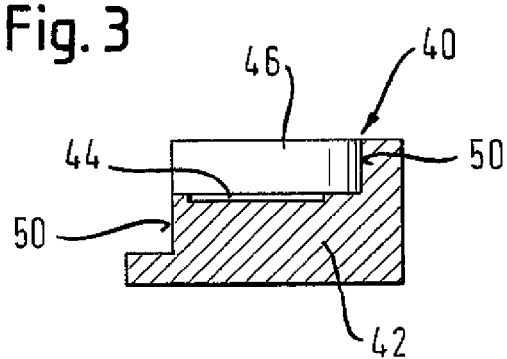

FIG. 3 The tool of FIG. 1 in a sectional view along lines 3-3.

FIG. 4 A plan view of a bush centring device for insertion in the tool of FIG. 1.

FIG. 5 The bush centring device of FIG. 4 in a sectional view along lines 5-5.

FIG. 6 The bush centring device of FIG. 4 in a sectional view along lines 6-6.

FIG. 7 A sectional view of the tool of FIG. 1 in accordance with FIG. 3 with inserted bush centring device.

FIG. 8 A sectional view corresponding to FIG. 7 with inserted transducer element and a bush brought into the stop position.

Figure 9:
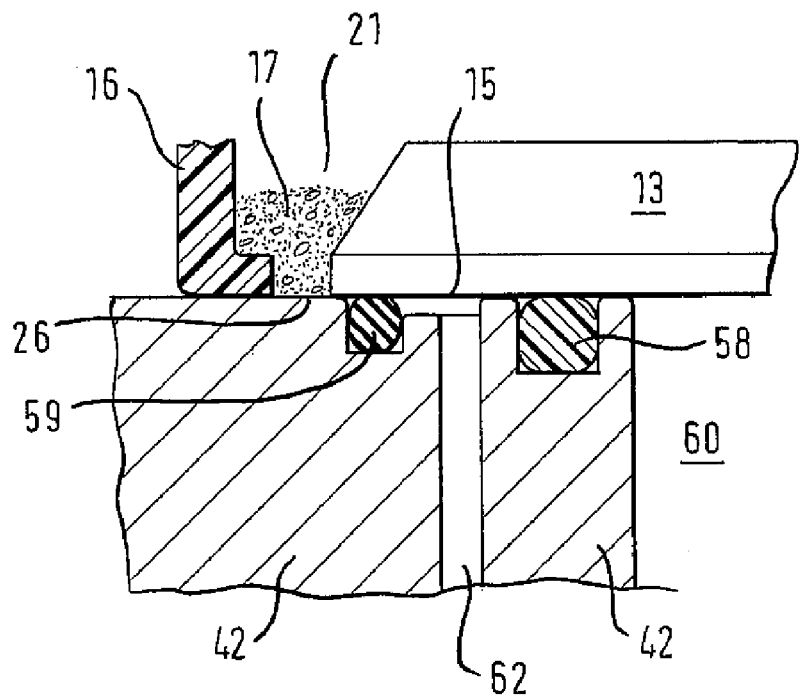

FIG. 9 A part sectional view of a transducer element vacuum-fixed to the tool and with a bush in a first embodiment.

Figure 10:
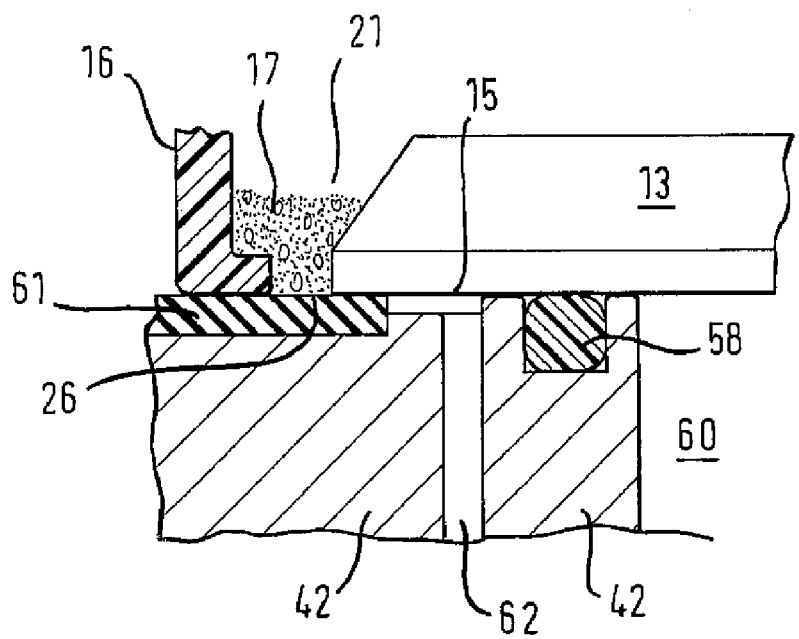

FIG. 10 In a part sectional view a transducer element vacuum-fixed to the tool and with a bush in a second embodiment.

Figure 11:
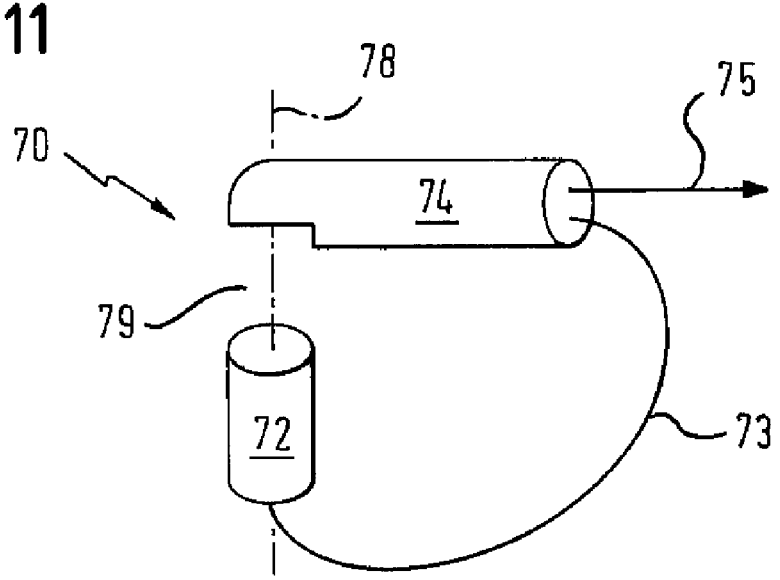
Figure 12:
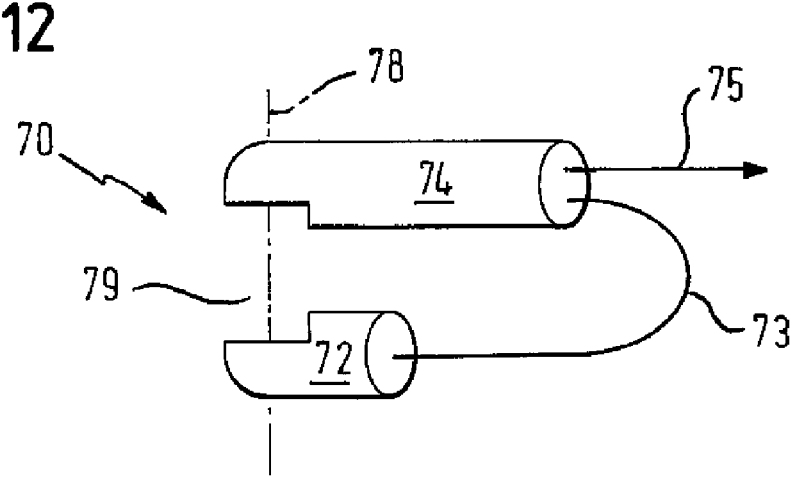
Figure 13:
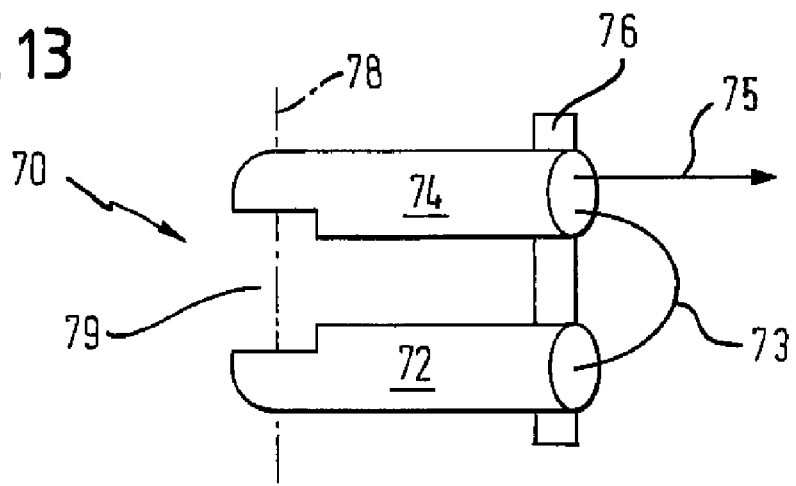

FIGS. 11 to 13 Examples for the use of the inventive angular switching devices in object detection devices.

Figure 14:
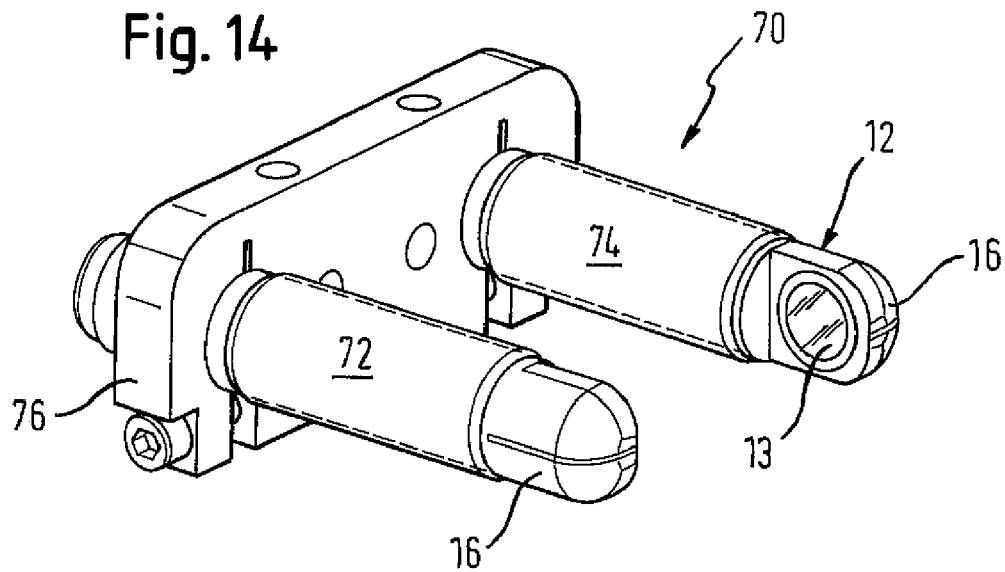

FIG. 14 A perspective view of an embodiment of an inventive device for the detection of objects, particularly single, missing or multiple sheets.

Figure 15:
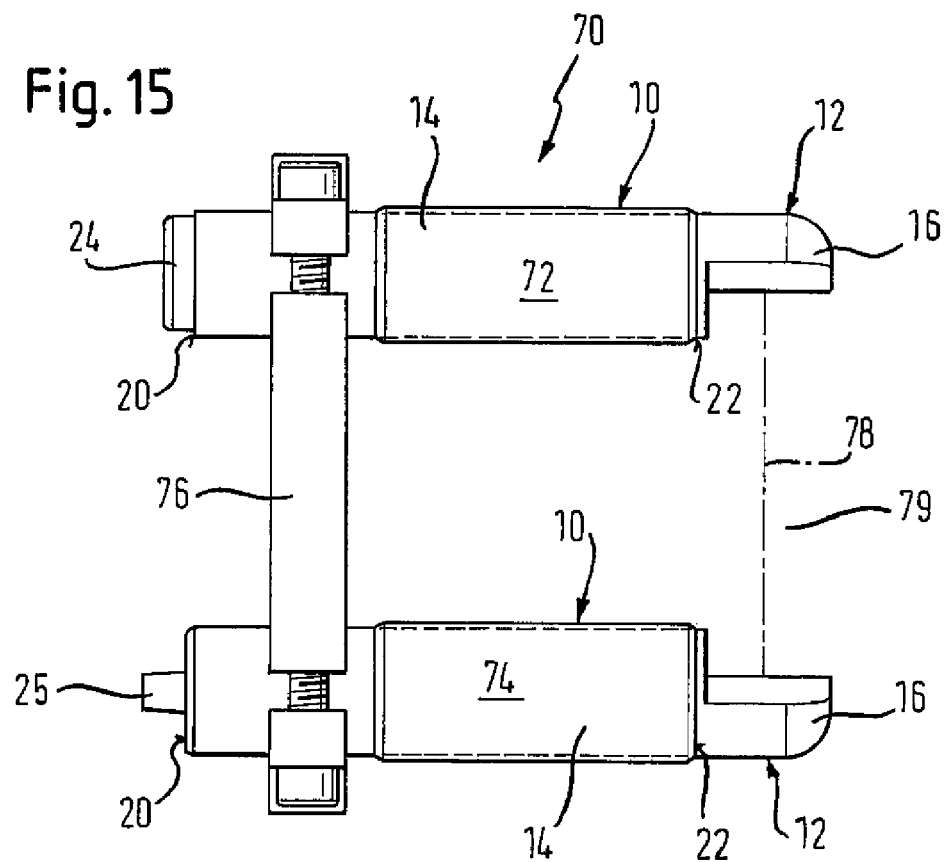

FIG. 15 A plan view of the device of FIG. 14.

The method according to the invention for the manufacture of an angular transducer unit 12 will now be described relative to FIGS. 1 to 8. A tool 40 used in this connection is shown in different representations in FIGS. 1 to 3. This tool 40 essentially comprises a tool body 42, which can e.g. be made from steel. In said tool body 42 is formed a bush receptacle 46, which in the example shown has a substantially square base surface with rounded corners. Within said bush receptacle 46 is formed a transducer receptacle 44 as a circular disk-shaped depression. In the manner shown in FIG. 2, for fixing a bush in the bush receptacle 46 a holder 48 is provided, which is held on the tool body 42 with the aid of magnets 52. As can be seen in FIG. 3, the tool body 42 is provided in the vicinity of bush receptacle 46 with a stepped, staircase-like profile with two steps 50 which, as shown e.g. in FIG. 8, can be brought into aligned engagement with a bush 16.

FIGS. 4 to 6 show a U-shaped bush centring device 54 to be inserted or engaged in the bush receptacle 46 of the tool body 42. Bush centring device 54 can also be made from steel. In FIG. 7 is shown a cross-sectional view of the tool 40 with inserted bush centring device 54.

FIG. 8 provides a corresponding sectional view of a bush 16 brought into stop engagement with tool 40. A transducer element 13 is fixed in aligned manner in transducer receptacle 44 using an adhesive film 56. The transducer receptacle 44 is constructed as a roughly 0.1 mm deep depression for receiving adhesive film 56. A bush centring device 54 is inserted in the tool body 42 and forms the bush receptacle 46 for bush 16.

As can be gathered from FIG. 8, a front end 19 of bush 16 engages with an inside of the bush centring device 54 and a setback shoulder 18 of bush 16 with a step 50 of tool body 42. This provides a precise aligned positioning of bush 16 relative to tool 40. Stop engagement of the setback shoulder 18 with step 50 does not take place if said shoulder 18, due to the manufacture of the bush 16, is not precisely defined. Finally bush 16 is fixed with the holder 48 with respect to the tool 40, so that in the situation shown in FIG. 8 manufacture of the transducer unit 12 can be completed by connecting transducer element 13 to bush 16, e.g. by foam filling of the gaps.

Method variants in which the transducer element 13 is fixed by vacuum with respect to the tool body 42 will be explained with reference to FIGS. 9 and 10. In a part sectional view FIG. 9 shows a situation in which a transducer element 13 and a bush 16 are inserted on or in a tool body 42. A precise alignment of the bush 16 can take place in the manner described above relative to FIG. 8. The transducer element 13 is sucked against the tool body 42 by means of a vacuum produced in a vacuum duct 60. A seal 58 is inserted in a circumferential groove in tool body 42 and ensures adequate vacuum sealing. The seal 58, which can e.g. be an O-ring, is consequently used for sealing the transducer surface.

If the transducer element 13 is correctly positioned relative to bush 16, for fixing transducer element 13 relative to bush 16 the gaps 21 are filled with foam 17. For this purpose a foam nozzle is inserted in bush 16 through a rear opening 23 in the latter (see FIG. 8). Therefore bush 16 is made as short as possible. To prevent a foam overflow over surface 26 defined by transducer element 13 and bush 16, the transition area between transducer element 13 and tool body 42 is additionally sealed. For this purpose, in the variant shown in FIG. 9, a further seal 59 is provided and is also inserted in a circumferential groove in tool body 42. Whereas seal 58 brings about vacuum sealing, seal 59, which can e.g. be an O-ring made from very flexible silicone, ensures an adequate foam or residual pressure seal to avoid a suction effect on the liquid filling material, particularly the foam. Thus, said seal 59 is positioned as far as possible radially to the outside relative to transducer element 13. Seals 58 and 59 must be carefully matched to one another, so that seal 59 is always pressed down and consequently ensures both an adequate vacuum sealing and foam sealing. In practice, seal 59 is made from a more flexible material than seal 58.

In the embodiment illustrated in FIG. 10 the area between transducer element 13 and tool body 42 is sealed by a rubber base 61 in order to obtain a suitable foam sealing.

An underfoaming of the transducer element 13 is also avoided in the examples disclosed by a pressure compensation taking place in compensating ducts 62 radially surrounding the vacuum ducts 60. Thus, there is no pressure gradient between the gaps 21 to be foamed and the pressure compensating ducts 62, so that under vacuum pressure action on a transducer ceramic there is no suction pressure on the foam. An important advantage can be achieved as a result of this in that the hardened foam, the transducer surface and the boundary surface of the bush 16 form a planar, well-defined termination. The quality of this plane is then essentially limited by the manufacture of the transducer surface and/or the bush surface. Any foam residues can optionally be removed by a cutting mould.

A precise alignment of transducer element 13 can be brought about with the aid of a centring form not shown in FIGS. 9 and 10 and which can also be referred to as a transducer centring device. Such a centring device can be placed in or on tool body 42 and a transducer element 13 can then be brought into aligned engagement therewith, i.e. in the simplest case inserted therein. Before or after this the vacuum can be connected in, so that the transducer element 13 is sucked onto the tool body 42. The centring device can then be removed, so that following foaming the transducer surface, boundary surface of the bush and hardened foam can form a planar termination.

For removing the centring device or centring mechanism the tool body 42 can be provided with a suitable guide, which in particular ensures the parallel nature of the removal.

Thus, the method brings about a clean, well defined boundary surface of the transducer element 13, which can e.g. be a piezoelectric element, the boundary surface of bush 16 and the hardened foam. A simple centring of the piezoelectric ceramic by hand or machine can, as described, take place by a centring form, which can also be called a transducer centring device. Said device, e.g. following the suction action of the transducer element 13 or following an adhesion of said element 13 with an adhesive film, can be easily removed. The bush 16 can then be pressed on by machine, particularly using a siphon and can be aligned with respect to the bush receptacle 46 in tool 40. This permits automated production, i.e. large scale industrial production.

Numerous variants of the object detection devices 70 according to the invention are shown in FIGS. 11 to 15. With each of said devices 70 there is a transmitter 72 for emitting a measuring signal in a detection area 79 and a receiver for receiving an incoming signal from detection area 79. In the variants shown the transmitter 72 is positioned facing receiver 74 in such a way that the radiation area of transmitter 72 and the receiving area of receiver 74 are substantially symmetrical to a common axis 78. As a function of the interaction of the objects to be detected with the irradiated radiation, in principle other arrangements are also possible.

In the case of the embodiments of FIGS. 11 to 13 transmission through an object located in detection area 79 or the shielding of the radiation through said object is measured. If in an alternative development the reflection through an object to be detected is to be measured, transmitter and receiver are arranged with a geometry determined by the reflection law.

In the three variants shown in each case the transmitter 72 is connected by a connecting line 73 to receiver 74, which is in turn connected by a line 75 to the corresponding supply and evaluating units.

In the embodiment of FIG. 11 transmitter 72 is axially constructed, which is particularly inexpensive.

A particularly compact example of a device for the detection of objects 70 is shown in FIG. 12, where both the transmitter 72 and receiver 74 is constructed as an angular switching device according to the invention.

A variant of the example of FIG. 12 is shown in FIG. 13, where transmitter 72 and receiver 74 are located in a joint holder 76, which permits a precise relative orientation of transmitter 72 and receiver 74 in a simple manner. This example is shown in greater detail in FIGS. 14 and 15, the corresponding components always having the same reference numerals.

FIG. 15 shows the basic structure of the inventive angular switching devices 10. An inventively manufactured transducer unit 12 is inserted at a front end 22 in a casing sleeve 14. At a rear end 20 of casing sleeve 14 is provided a connection part 24 or 25 by means of which electronics in the casing sleeve are connected to external supply and evaluating devices. Said switching devices 10 can be advantageously manufactured by a single-operation method, such as is e.g. described in German patent application 103 59 885.5. For this purpose a transducer unit 12, a support with an electronic circuit, a shielding sleeve and the connection part 24, 25 form a module, which is then inserted into the casing sleeve 14 from front end 22. There is no need for separate centring measures.

Connection parts 24, 25 are preferably made in a fully transparent manner, so that via suitable lighting means a status display to the outside can take place. The transparent construction permits a quasi-all-round visibility, such as is e.g. described in German patent application 103 43 529.8.

The variants of the devices for the detection of objects 70 shown in FIGS. 11 to 15 can e.g. be constructed as ultrasonic barriers with ultrasonic transmitters 72 and ultrasonic receivers 74. Such ultrasonic barriers and sensors are more particularly used in paper-processing machines, such as scanners, copiers and paper cutting machines. In general, for the detection of the corresponding paper sheets, i.e. particularly for detecting single, multiple and/or missing sheets, high frequency sound is used.

In alternative variants use can be made of light sensors or a capacitance measurement is performed. The sensors arranged in angular manner permit a very good installation solution, particularly with machines where the space conditions are very confined, especially in the case of a small construction hight. Although it is still very compact, the variant of FIG. 11 is very inexpensive, the transmitter 72 being housed in an approximately 20 mm long casing sleeve.

The invention claimed is:

1. Method for the manufacture of an angular transducer unit for an angular switching device, comprising:
    inserting and fixing a transducer element in an angled bush, wherein the angled bush comprises a tubular component having an axial direction and an opening opening transversely to the axial direction for receiving the transducer element, the inserting and fixing of the transducer element in the angled bush comprising:
    bringing the transducer element into aligned engagement with a transducer receptacle in a tool,
    inserting or engaging a bush centring device in a body of the tool to form a bush receptacle,
    bringing the bush into an aligned, at least partial engagement with the bush receptacle in the tool, to position the bush with respect to the transducer element,
    fixing the transducer element in the bush, and
    at least partially forming the transducer receptacle by inserting or engaging a transducer centring device in the tool body.

2. Method according to claim 1, further comprising fixing the transducer element relative to the tool.

3. Method according to claim 2, wherein the fixing of the transducer element is provided using at least one of: vacuum, adhesives, adhesive tapes, or magnets.

4. Method according to claim 1, further comprising fixing the transducer centring device relative to the tool body.

5. Method according to claim 1, further comprising fixing the bush centring device relative to the tool body.

6. Method according to claim 4, wherein the fixing of the transducer centring device is provided using at least one of: adhesives, adhesive tapes, vacuum, or magnets.

7. Method according to claim 5, wherein the fixing of the bush centring device is provided using at least one of: adhesives, adhesive tapes, vacuum, or magnets.

8. Method according to claim 3, further comprising sucking the transducer element onto the tool by means of at least one vacuum duct in the tool body.

9. Method according to claim 8, wherein a pressure compensation takes place on radially outer areas of the sucked on transducer element by means of compensating ducts in the tool body.

10. Method according to claim 1, further comprising removing the transducer centring device prior to fixing the transducer element in the bush.

11. Method according to claim 1, wherein the fixing of the transducer element in the bush is provided by at least partly filling gaps with at least one of: foam or moulding material.

12. Method according to claim 1, wherein use is made of a tool with steps, which as a stop engages with at least one of: a front end or a setback shoulder of the bush.

13. Method according to claim 1, further comprising manufacturing several transducer units in parallel using a plurality of transducer receptacles and bush receptacles.

14. Method according to claim 1, further comprising fixing the bush relative to the tool.

15. Method according to claim 14, wherein the fixing of the bush is provided using a holder provided on the tool.

16. Method according to claim 1, further comprising inserting and fixing several transducer elements in the angled bush.

17. Method according to claim 1, further comprising pressing a shielding can into the bush.

18. Method according to claim 17, further comprising fixing the shielding can to a printed circuit board.

19. Method according to claim 18, further comprising soldering the shielding can to the printed circuit board.

20. Method according to claim 17, further comprising soldering the transducer unit to the shielding can.

21. Method according to claim 18, further comprising soldering the transducer unit to the shielding can.

22. Method according to claim 20, further comprising soldering the transducer unit to the shielding can by means of at least one clip provided thereon.

23. Method according to claim 1, further comprising bringing the bush into at least one of: a positive, a non-positive engagement, or a locking engagement with a printed circuit board.

* * * * *